Patented Jan. 16, 1951

2,538,568

UNITED STATES PATENT OFFICE 2,538,568

COMPLEX COPPER COMPOUNDS OF DISAZO DYESTUFFS

Otto Kaiser, Dornach, Willy Widmer, Bottmingen, Arthur Buehler, Rheinfelden, and Christian Zickendraht, Binningen, Switzerland, assignors to Ciba Limited, Basel, Switzerland, a Swiss firm No Drawing. Application June 7, 1948, Serial No. 31,604. In Switzerland July 4, 1947

5 Claims. (Cl. 260—148)

According to this invention valuable new azo-dyestuffs are obtained by coupling a diazo-compound of an amino of the general formula

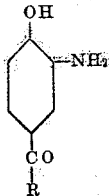

in which R represents an alkyl or aryl radical, with a coupling component which couples in a position vicinal to a hydroxyl group.

The invention also includes the manufacture of complex metal compounds by treating a dyestuff obtainable by the above process with an agent yielding metal.

The compounds corresponding to the above formula can be made, for example, by reduction, for instance, catalytic reduction, of the corresponding nitro-compounds. Such nitro-compounds are described, for example, in the Journal of the American Chemical Society, vol. 68, page 872 (1946), and in United States Patent No. 1,654,287. As examples of amino-compounds corresponding to the above formula, and which may be used with advantage as starting materials in the present invention, there may be mentioned especially those of which the radical R is a hydrocarbon radical containing up to 7 carbon atoms as for instance 3-amino-4-hydroxy-1-acetophenone, (3-amino-4-hydroxy-phenyl)-n-propyl ketone, (3-amino-4-hydroxy-phenyl)-n-butyl ketone, (3-amino-4-hydroxy-phenyl)-n-amyl ketone and 3-amino-4-hydroxy-2'-carboxy-diphenyl ketone.

The coupling components serving as starting materials in the present invention may owe their capacity for coupling, for example, to an aromatic hydroxyl group or a reactive keto-methylene group. Depending on the choice of the coupling components there can be obtained in this manner, for example, metallizable mono-azo-dyestuffs which are sparingly soluble to insoluble in water and soluble in cellulose ester lacquers, or water-soluble monoazo-dyestuffs, which advantageously contain sulfonic acid groups, and which are principally suitable for dyeing animal fibers, but also azo-dyestuffs which are suitable for dyeing cellulosic materials, for example, those dyestuffs which contain a plurality of azo-groups, advantageously disazo-dyestuffs.

In order to produce by the present invention monoazo-dyestuffs which are sparingly soluble to insoluble in water there are very suitable as coupling components, for example, hydroxynaphthalenes which couple in a position vicinal to a hydroxyl group or 5-pyrazolones. As examples of such compounds there may be mentioned: 2-hydroxynaphthalene, 6-bromo-2-hydroxynaphthalene, 5:8-dichloro-1-hydroxynaphthalene, hydroxy-methoxynaphthalenes such as 1:4-, 2:6- or 2:7-hydroxy-methoxynaphthalene, alkylnaphthalenes such as 4-methyl-, 4-ethyl- or 4-butyl-1-hydroxynaphthalene, dihydroxynaphthalenes such as 2:6- or 2:7-dihydroxynaphthalene, acylamino-hydroxynaphthalenes such as 2-acetylamino-6- or -7-hydroxynaphthalene, keto-compounds of hydroxynaphthalenes such as (4-hydroxyl-naphthyl)-phenyl ketone or (4-hydroxy-1-naphthyl)-methyl ketone, 2-hydroxynaphthalene-3-carboxylic acid arylides such as 2-hydroxynaphthalene-3-carboxylic acid anilide; 3-methyl-5-pyrazolone; 1-aryl-3-methyl-5-pyrazolones such as 1-phenyl-, 1-(2'-chloro)-phenyl-, 1-(2'methyl)-phenyl-, 1-(3'-sulfonamido)-phenyl-, 1-(2':5'-dichloro)-phenyl- or 1-(3'-nitro)-phenyl-3-methyl-5-pyrazolone; and diphenyl-pyrazolones such as 1:3-diphenyl-5-pyrazolone. There are also suitable coupling components of the benzene series and also those of the open chain series, such as 1:3-dihydroxybenzene, 1-hydroxy-4-methylbenzene or 1-hydroxy-4-tertiary-amyl-benzene; acetoacetic acid arylides such as acetoacetic acid anilide; and 2:4-dihydroxyquinoline.

As coupling components which are especially suitable for making water-soluble monoazo-dyestuffs containing sulfonic acid groups in accordance with the invention there may be mentioned; hydroxynaphthalene sulfonic acids which couple in a position vicinal to a hydroxyl group, and 1-sulfoaryl-5-pyrazolones especially 1-sulfophenyl-5-pyrazolones. As examples there may be mentioned: 1-hydroxynaphthalene-3-, -4-, -5-, -8-sulfonic acid, 2-hydroxynaphthalene-4-, -6- or -7-sulfonic acid, 1-hydroxy-naphthalene-3:6- or -3:8-disulfonic acid, 2-hydroxynaphthalene-3:6-disulfonic acid; acylamino-hydroxynaphthalene sulfonic acids such as 2-acetylamino-6-hydroxynaphthalene-8-sulfonic acid or 1-acetylamino-8-hydroxynaphthalene-4-sulfonic acid; arylamino-hydroxynaphthalene sulfonic acids such as 1-phenylamino-8-hydroxynaphthalene-4-sulfonic acid; and 1-(3'-sulfo)-phenyl-, 1-(4'-sulfo)-phenyl- or 1-(2'-methyl-4'-sulfo)-phenyl-3-methyl-5-pyrazolone.

For making azo-dyestuffs which are especially suitable for dyeing cellulosic materials there are advantageously chosen for use in the present invention those coupling components which are capable of imparting substantivity for cellulosic fibers to the dyestuffs or of enhancing their substantivity for cellulosic fibers. For this purpose there come into consideration above all N-substituted derivatives of 2-amino-5-hydroxynaphthalene-7-sulfonic acid and especially those N-substituted derivatives of 2-amino-5-hydroxynaphthalene-7-sulfonic acid which are capable of coupling twice such, for example, as the compounds containing two radicals of 5-hydroxy-naphthalene-7-sulfonic acid which radicals are linked together in their 2-positions by means of a bridge member and each of which is bound in its 2-position to a nitrogen atom. These bridge members preferably may be built up in such manner that the direct chain which links the two radicals of 5-hydroxy-7-sulfonic acid together contains from one to five atoms. The compounds of this type which contain symmetrical bridge members are especially valuable. As examples then can be mentioned in this connection:

Above all 5:5'-dihydroxy-2:2'-dinaphthylurea-7:7'-disulfonic acid, but also 5:5'-dihydroxy-2:2'-dinaphthylamino-7:7'-disulfonic acid, and also condensation products in which two molecules of 2-amino-5-hydroxynaphthalene-7-sulfonic acid are connected together by a heterocyclic bridge, for example, a cyanuric or quinazoline radical. As examples of compound of the latter group there may be mentioned: The condensation product of 1 molecular proportion of cyanuric chloride, 2 molecular proportion of 2-amino-5-hydroxynaphthalene-7-sulfonic acid and 1 molecular proportion of amino-benzene; and the condensation product of 1 molecular proportion of 2:4-dichloroquinazoline and 2 molecular proportion of 2-amino-5-hydroxynaphthalene-7-sulfonic acid. With such derivatives of 2-amino-5-hydroxynaphthalene-7-sulfonic acid capable of coupling twice and the diazo-components of amines of the above general formula there can be made, for example, symmetrical disazo-dyestuffs. Especially good properties are exhibited by the asymmetrical disazo-dyestuffs which are obtained by coupling 1 molecular proportion of a derivative of 2-amino-5-hydroxynaphthalene-7-sulfonic acid capable of coupling twice with 1 molecular proportion of a diazo-compound of amine of the above formula and 1 molecular proportion of another diazo-compound, advantageously one which contains in a position vicinal to the diazo-group a group which is capable of taking part in the formation of metal complexes, for example, a diazo-compound of the benzene series containing such a group as for instance a hydroxyl group. For this purpose there come into consideration, for example, the diazo-compounds of the following amines: 2-amino-1-hydroxybenzene-4-sulfonic acid, 6-chloro-2-amino-1-hydroxybenzene-6-sulfonic acid, 2-amino-1-hydroxybenzene-4-carboxylic acid anilide, 2-amino-1-hydroxybenzene-4-carboxylic acid-n-butylamide, 1-aminobenzene-2-carboxylic acids and their nuclear substitution products, and 2-amino-1-methoxybenzene-4-sulfonic acid.

The dyestuffs obtainable from the condensation products of 2 molecular proportion of 2-amino-5-hydroxynaphthalene-7-sulfonic acid and 1-molecular proportion of a heterocyclic bridge member in the manner described above may also be made by first coupling the diazo-compound with 2-amino-5-hydroxynaphthalene-7-sulfonic acid and then linking 2 molecular proportions of the aminoazo-dyestuff simultaneously or in succession with 1 molecular proportion of the heterocyclic bridge member, and, when a free halogen atom is still present (for example, in condensing with cyanuric chloride), a further reaction, for example, with aminobenzene, may be carried out. In this manner either symmetrical or asymmetrical dyestuffs may be made.

The diazotization of the amines of the above general formula used as starting materials in the present invention may be brought about by the usual known methods, for example, with the aid of sodium nitrite in a medium rendered acid with hydrochloric acid. The coupling is generally carried out with advantage in an alkaline medium, for example, a medium rendered alkaline with alkali carbonate or alkali hydroxide. In coupling with derivatives of 2-amino-5-hydroxynaphthalene-7-sulfonic acid capable of coupling twice it is generally of advantage to work in a medium containing calcium hydroxide. If desired, the coupling may also be conducted in the presence of a suitable solvent such as alcohol or pyridine.

The azo-dyestuffs obtainable by the present invention are new and correspond to the general formula

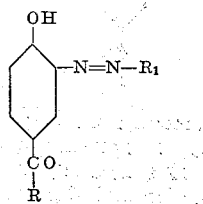

in which R represents an alkyl or aryl residue, and $R_1$ represents the radical originating from a coupling component which contains a hydroxyl group in a position vicinal to the —N=N—linkage.

The new azo-dyestuffs obtainable by the invention may be used for coloring, dyeing or printing a very wide variety of materials.

The dyestuffs may be treated with agents yielding metal, and this treatment may be carried out in a manner in itself known.

Thus, for example, the monoazo-dyestuffs free from sulfonic acid groups and having the general formula

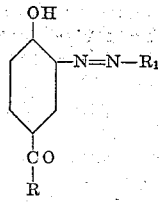

in which R represents an alkyl or aryl residue, and $R_1$ represents the residue of a coupling component which contains a hydroxyl group in a position vicinal to the —N=N—linkage, are converted into complex metal compounds by treatment in substance with agents yielding metal. As agents yielding metal there come into consideration in this connection, for example, agents yielding iron, nickel, cobalt, aluminium, manganese, copper, and above all chromium. The treatment with an agent yielding metal is advantageously carried out by the process of U. S. patent application Ser. No. 774,879, filed September 18, 1947, in a neutral to alkaline medium in the presence of an aromatic ortho-hydroxy-carboxylic acid or salt thereof in such manner that there is used less than one atomic proportion of the complex-forming metal for each group capable of forming a complex. The complex metal compounds so obtained generally dissolve well in alcohol, acetone and also in nitrocellulose ester lacquers, and are therefore, suitable for producing colored coatings which as a rule possess good fastness to light.

The water-soluble monoazo-dyestuffs obtainable by the invention and having the general formula

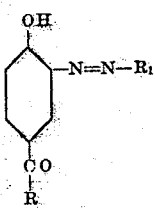

in which R represents an alkyl or aryl residue, and $R_1$ represents the residue of a coupling component containing a sulfonic acid group and bound to the —N=N— linkage in a position vicinal to a hydroxyl group, may also be treated in substance or on the fiber with agents yielding metal. Especially valuable results are obtained by treatment with an agent yielding chromium. The treatment on the fiber may, for example, be carried out by the known after-chroming processes. In this manner very fast dyeings are obtained. For treating these monoazo-dyestuffs containing sulfonic acid groups in substance with agents yielding chromium there come into consideration practically all the chromium compounds which are ordinarily used for converting azo-dyestuffs into complex chromium compounds, and therefore especially salts of trivalent chromium such as the acetate, the formate and above all the fluoride or the sulfate. The treatment is advantageously conducted in an aqueous medium, in the presence or absence of an organic solvent such as alcohol or pyridine, in an alkaline, neutral or acid medium, and under atmospheric or superatmospheric pressure. With these dyestuffs it is in most cases of advantage to use for 1 molecular proportion of the dyestuff 1 atomic proportion or a certain excess of chromium. The complex metal compounds, especially the complex chromium compounds, obtainable from these monoazo-dyestuffs containing sulfonic acid groups are suitable above all for dyeing animal textile fibers such as silk, leather and principally wool. The dyeings obtainable therewith are distinguished by good fastness to washing, fulling and light.

The dyestuffs obtainable by the invention which contain metallizable groups and are suitable for dyeing cellulosic fibers, especially the disazo-dyestuffs mentioned above which are obtained from derivatives of 2-amino-5-hydroxy-naphthalene-7-sulfonic acid capable of coupling twice, may also be treated in substance, on the fiber or in the dyebath with agents yielding metal, advantageously agents yielding copper. The treatment with an agent yielding metal, for example, yielding copper, is advantageously carried out in substance especially when the complex metal compound still possesses adequate solubility. It may be conducted in an alkaline, neutral or acid medium, with or without the addition of a substance favoring the formation of complexes or increasing the solubility. When the dyestuffs do not contain sufficient groups imparting solubility, so that their complex metal compounds are less well suited for dyeing, the treatment with an agent yielding metal, especially an agent yielding copper, may in some cases be carried out with advantage on the fiber or in a single bath in part in the dyebath and in part on the fiber, as described, for example, in U. S. Patent No. 2,148,659. In many cases very valuable dyeings are also obtained by using the process in which dyeings produced with the metal-free dyestuffs are after-treated with aqueous solutions which contain a basic formaldehyde condensation product of a compound containing at least once the atomic grouping

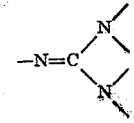

or a compound, for example cyanamide, easily convertible into such a compound, and a water-soluble complex metal, especially copper, compound. Such processes are described, for example, in abandoned U. S. patent application Serial No. 677,920, filed June 19, 1946.

The following examples illustrate the invention, the parts and percentages being by weight:

*Example 1*

15.1 parts of 3-amino-4-hydroxy-acetophenone are suspended in 22 parts of hydrochloric acid of 30 per cent. strength and 150 parts of water, and diazotized at 2–5° C. with a concentrated solution of 7 parts of sodium nitrite. The diazo compound completely dissolves. The clear pale yellow diazo solution is run into a solution of 25.4 parts of 1-(3'-sulfo)-phenyl-3-methyl-5-pyrazolone, 5.6 parts of potassium hydroxide and 13.8 parts of potassium carbonate in 200 parts of water, while the temperature of coupling is maintained at 0–5° C. by external cooling. When the introduction is complete the whole is stirred for a further 4 hours at the same temperature. At the end of this period the formation of dyestuff ceases. The resulting dyestuff of the formula

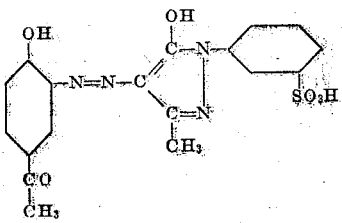

is separated by the addition of potassium chloride, filtered and dried. It is an orange powder which dissolves in water with a red-orange coloration, in dilute sodium hydroxide solution with a yellow coloration and in concentrated sulfuric acid with a gold-yellow coloration. The dyestuff dyes wool from an acid bath yellow-orange tints which upon being after-chromed are converted into brownish-orange tints of good fastness to fulling and light.

Dyestuffs having similar properties are obtained by using instead of 1-(3'-sulfo)-phenyl-3-methyl-5-pyrazolone, 1-(4'-sulfo)-phenyl-3-methyl-5-pyrazolone or 1-(2'-methyl-4'-sulfo)-phenyl-3-methyl-5-pyrazolone and in other respects proceeding in the manner described above.

*Example 2*

15.1 parts of 3-amino-4-hydroxy-acetophenone are diazotized in the manner described in Example 1. The diazo solution is added to a solution of 22.4 parts of 1-hydroxynaphthalene-4-sulfonic acid, 5.6 parts of potassium hydroxide and 13.8 parts of potassium carbonate in 160 parts of water at 0–5° C. The whole is stirred for a further 4 hours, while the temperature is allowed to rise slowly to 20° C. When the coupling has ceased the resulting dyestuff of the formula

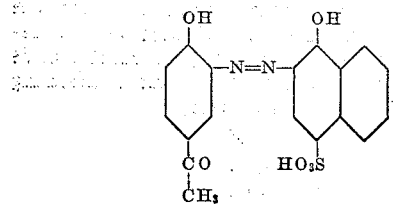

is completely precipitated by acidification or by the addition of potassium chloride, filtered and, if desired, purified by reprecipitation. It is a powder having a green-bronze lustre which dissolves in water with a violet coloration and in concentrated sulfuric acid with a bluish red coloration. The dyestuff dyes wool from an acid bath bordeaux red tints, which become reddish-violet when after-chromed.

A dyestuff having similar properties, but of which the after-chromed dyeings are of a somewhat more bluish shade, is obtained by using 1-hydroxynaphthalene-5-sulfonic acid instead of 1-hydroxynaphthalene-4-sulfonic acid.

*Example 3*

32.8 parts of the sodium salt of the dyestuff from diazotized 3-amino-4-hydroxyacetophenone and 2-hydroxy-naphthalene and corresponding to the formula

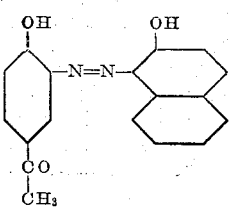

are suspended in 200 parts of water. 204 parts of a solution of potassium-sodium chromosalicylate having a chromium content of 1.53 per cent. are added. The solution of potassium-sodium chromosalicylate is obtained, for example, by boiling 43.4 parts of a chromic sulfate solution having a chromium content of 7.2 per cent with 16.6 parts of salicylic acid and 100 parts of water, dissolving the resulting precipitate by the addition of 22 parts of sodium hydroxide solution of 33 per cent. strength and 22 parts of potassium hydroxide solution of 37 per cent. strength. After boiling the whole for 6 hours the chroming ceases. Acetic acid is added until the reaction is acid to litmus, the dyestuff is separated by filtration, washed and dried. The chromed dyestuff is a violet powder which is sparingly soluble in water and dissolves in alcohol with a wine red coloration. By means of a solution of the dyestuff in a nitrocellulose lacquer there are obtained reddish-violet coatings on suitable substrata.

*Example 4*

35.8 parts of the sodium salt of the dyestuff from diazotized 3-amino-4-hydroxyacetophenone and 1 - phenyl - 3 - methyl - 5 - pyrazolone are chromed in the manner described in Example 3. The dried dyestuff is an orange-brown powder which is sparingly soluble in water and dissolves easily in alcohol with an orange coloration. By means of a solution of the dyestuff in a nitrocellulose lacquer orange coatings are obtained on suitable substrata.

*Example 5*

The diazo solution obtained from 15.1 parts of 3-amino-4-hydroxy-acetophenone as described in Example 1 is added at 5–8° C. to a solution of 22.4 parts of 2-hydroxynaphthalene-6-sulfonic acid, 4.2 parts of sodium hydroxide and 12 parts of sodium carbonate in 160 parts of water, and stirred at the same temperature until the formation of dyestuff ceases. The resulting dyestuff of the formula

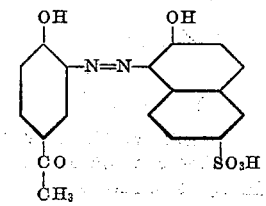

is separated by filtering with suction, and if desired purified by dissolution in water and reprecipitation with sodium chloride, and dried. It is a grey powder which dissolves in water with a violet coloration, in concentrated sulfuric acid with a yellowish red coloration, and dyes wool from an acid bath brown-red tints, which when after-chromed become violet tints of good fastness to fulling and light.

*Example 6*

41.6 parts of the dyestuff obtained as described in the first paragraph of Example 1 are boiled in a reflux apparatus for a long time in 1500 parts of chromium fluoride solution containing 6.6 parts of chromium. The complex chromium compound is precipitated from the solution, by the addition of sodium chloride, by filtration and dried. The dyestuff is a brown-red powder which dissolves in water with an orange coloration and in concentrated sulfuric acid with a greenish-yellow coloration, and dyes wool from a sulfuric acid bath orange tints having good properties of fastness.

Complex chromium compounds having similar properties are obtained by starting from the dyestuffs described in the second paragraph of Example 1, and carrying out the chroming operation in the manner described above.

*Example 7*

42 parts of the dyestuff obtainable as described in the first paragraph of Example 2 are boiled in a reflux apparatus for 24 hours in 1200 parts of chromium sulfate solution containing 6.6 parts of chromium. The resulting complex chromium compound is worked up in the usual manner, and in the dry state it is a grey powder which dissolves in water with a bluish-red coloration and in concentrated sulfuric acid with a violet coloration, and dyes wool from a sulfuric acid bath pure blue-violet tints having good properties of fastness.

A complex chromium compound having similar properties is obtained by starting from the dyestuff described in Example 5, and carrying out the chroming operation in the manner described above.

*Example 8*

15.1 parts of 3-amino-4-hydroxy-acetophenone are diazotized in the manner described in Example 1, and the diazo compound is coupled with 36.8 parts of the ternary condensation product from 1 molecular proportion of cyanuric chloride, 2 molecular proportions of 2-amino-5-hydroxynaphthalene-7-sulfonic acid and 1 molecular proportion of aminobenzene, which product is dissolved in the form of its sodium salt in 500 parts of water with the addition of 50 parts of a suspension of calcium hydroxide of 20 per cent. strength. After 4 hours the dyestuff so obtained is precipitated by means of hydrochloric acid and separated by filtration. The filter residue is dissolved in the form of its sodium salt. The dyestuff of the formula

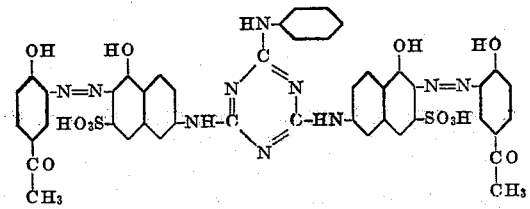

is precipitated from the solution by means of sodium chloride, separated by filtration and dried. It is a black powder which dyes cotton from a weakly alkaline bath red tints. By adding to the dyebath a copper salt solution prepared from copper sulfate and sodium tartrate the tint of the dyeing is changed towards ruby-red. The dyeing is fast to washing and light.

By replacing 3-amino-4-hydroxy-acetophenone in this example by (3-amino-4-hydroxyphenyl)-propyl-ketone or by 3-amino-4-hydroxy-2'-carboxy-diphenyl ketone there are obtained dyestuffs having similar properties.

*Example 9*

The mixed diazotization product obtained in the usual manner from 22.8 parts of 2-amino-1-hydroxybenzene-4-carboxylic acid phenyl amide and 15.1 parts of 3-amino-4-hydroxy-acetophenone is coupled with 50.4 parts of the urea of 2-amino-5-hydroxynaphthalene-7-sulfonic acid, which is dissolved in 1000 parts of water in the form of its sodium salt with the addition of 100 parts of a suspension of calcium hydroxide of 20 per cent. strength. After 4 hours the resulting dyestuff is precipitated by the addition of hydrochloric acid, and separated by filtration. The filter residue is converted into its complex copper compound in known manner by the addition of a solution of 50 parts of crystalline copper sulfate in 200 parts of ammonia solution of 25 per cent. strength and 200 parts of water at 70–75° C. The copper compound so formed of the dyestuff of the formula

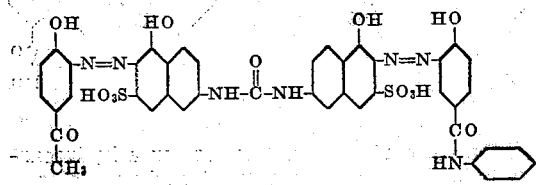

is precipitated by the addition of 50 parts of sodium chloride, separated by filtration and dried.

The new cupriferous dyestuff is a dark powder which dyes cotton bordeaux tints. The dyeing is fast to washing and light.

By using, instead of 2-amino-1-hydroxybenzene-4-carboxylic acid phenyl amide, 2-amino-1-hydroxybenzene-4-sulfonic acid or the sulfonamide thereof, or 6-chloro-2-amino-1-hydroxybenzene-4-sulfonic acid there are obtained dyestuffs having similar properties. By replacing in the above example the urea of 2-amino-5-hydroxynaphthalene-7-sulfonic acid by the ternary condensation product from 1 molecular proportion of cyanuric chloride, 2 molecular proportion of 2-amino-5-hydroxynaphthalene-7-sulfonic acid and 1 molecular proportion of aminobenzene there is obtained a dyestuff having similar properties.

A bluish-violet dyestuff is obtained by using 5:5'-dihydroxy-2:2'-dinaphthylamine-7:7'-disulfonic acid, instead of the above mentioned urea of 2-amino-5-hydroxy-naphthalene-7-sulfonic acid.

*Example 10*

The mixed diazotization product which is obtained in the usual manner from 18.8 parts of 2-amino-1-hydroxy benzene-4-sulfonic acid amide and 17.9 parts of (3-amino-4-hydroxy phenyl)-n-propyl ketone are coupled with 50.4 parts of the urea of 2-amino-5-hydroxynaphthalene-7-sulfonic acid, which is dissolved in the form of its sodium salt in 1000 parts of water with the addition of 100 parts of a suspension of calcium hydroxide of 20 per cent. strength. After 4 hours the dyestuff formed is precipitated by the addition of hydrochloric acid and separated by filtration. The filter residue is converted into its complex compound in known manner by treatment with a solution of 50 parts of crystalline copper sulfate in 200 parts of ammonia solution of 25 per cent. strength and 200 parts of water at 70–75° C. The copper compound so formed of the dyestuff of the formula

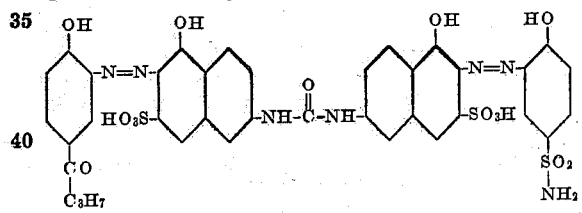

is precipitated by the addition of 50 parts of sodium chloride, separated by filtration and dried.

The new cupriferous dyestuff is a dark powder which dyes cotton bordeaux tints. The dyeing is fast to washing and light.

By using, instead of 2-amino-1-hydroxybenzene-4-sulfonic acid amide, 6-chloro-2-amino-1-hydroxybenzene-4-sulfonic acid amide or 2-amino-1-hydroxybenzene-4-carboxylic acid anilide or 2-amino-1-hydroxybenzene-4-carboxylic acid n-butylamide there are obtained dyeings having similar properties. The last mentioned dyestuff is a complex copper compound of the disazo dyestuff of the formula

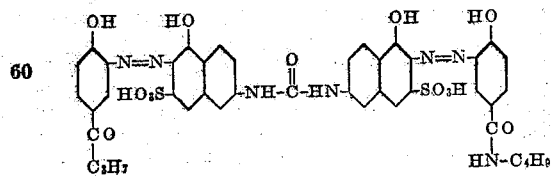

*Example 11*

The mixed diazotization product which is obtained in the usual manner from 22.3 parts of 6-chloro-2-amino-1-hydroxybenzene-4-sulfonic acid and 15.1 parts of 4-hydroxy-3-amino acetophenone are coupled with 60.4 parts of the condensation product from 1 molecular proportion of 2:4-dichloro-quinazoline and 2 molecular proportion of 2-amino-5-hydroxynaphthalene-7-sulfonic acid, which is dissolved in the form of its sodium salt in 2000 parts of water with the addition of 100 parts of a suspension of calcium hydroxide of 20 per cent. strength. After 4 hours the dyestuff formed is precipitated by the addition of hydrochloric acid and separated by filtration. The filter residue is dissolved in the form of its sodium salt. The dyestuff of the formula

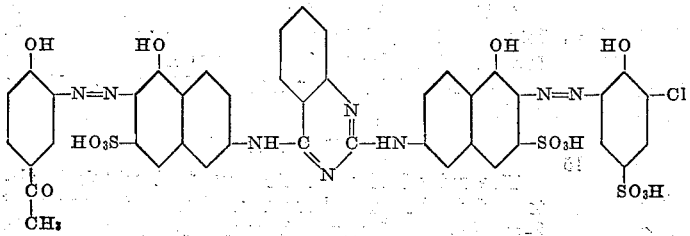

is precipitated from the solution by means of sodium chloride, separated by filtration and dried. It is a black powder which dyes cotton from a weakly alkaline bath red tints. By the addition to the dyebath of a copper salt solution prepared from copper sulfate and sodium tartrate the tint is changed towards red-violet. The dyeing is fast to washing and light.

By using in the above example, instead of 6-chloro-2-amino-1-hydroxybenzene - 4 - sulfonic acid, 1-hydroxy-2-aminobenzene - 4 - carboxylic acid phenylamide a dyestuff having similar properties is obtained.

The dyestuffs described in Examples 9 to 12 hereinbefore can also be obtained by coupling first one of the two diazo compounds with the coupling component and then coupling with the monoazo-dyestuff so obtained the other diazo compound. The dyestuffs obtained in this way have practically the same properties as those obtained in accordance with the prescriptions given above.

Example 12

100 parts of well wetted wool are entered at 60° C. into a dyebath which contains in 4000 parts of water 1 part of the dyestuff obtainable as described in Example 5, 4 parts of acetic acid of 40 per cent strength and 10 parts of crystalline sodium sulfate. The temperature is raised to the boil in the course of 30 minutes and dyeing is carried on at the boil for 45 minutes. The dyebath is then cooled to about 70° C., 1 part of potassium bichromate is added, and the whole is brought to the boil and chroming is carried on for 40 minutes at the boil. The wool is dyed a fast violet tint.

Example 13

100 parts of well wetted wool are entered at 70° C. into a dyebath which contains in 3000 parts of water 1 part of the dyestuff obtainable as described in Example 7, and 40 parts of sulfuric acid of 10 per cent. strength, and the bath is slowly heated to the boil. After boiling for ¼ hour, a further 40 parts of sulfuric acid of 10 per cent. strength are added and dyeing is carried on at the boil for 1½ hours. The wool is then rinsed and finished in the usual manner. It is dyed a fast blue-violet tint.

Example 14

100 parts of cotton are entered into a dyebath at 50° C. containing in 4000 parts of water 2 parts of anhydrous sodium carbonate and 0.7 part of the dyestuff obtainable as described in the first paragraph of Example 8. The temperature of the bath is slowly raised to the boil, 30 parts of crystalline sodium sulfate are added, and dyeing is carried on for ¾ hour at 95-100° C. The bath is then allowed to cool to about 70° C., 4 parts of complex copper-sodium tartrate of approximately neutral reaction are added, coppering is carried on at about 80° C., for ½ hour, and the goods are thoroughly rinsed with cold water. A ruby red dyeing is obtained which is of good fastness to washing and light.

Example 15

A dyebath is prepared from 3000 parts of water, 2 parts of anhydrous sodium carbonate, 1 part of the dyestuff obtained as described in the first paragraph of Example 9, and 30 parts of crystalline sodium sulfate. 100 parts of cotton are entered into the dyebath at 40° C., the temperature is raised to 95° C., and dyeing is carried on at this temperature for 1 hour. The cotton is then rinsed and dried. It is dyed a bordeaux tint, and the dyeing is distinguished by good fastness to washing and light.

What we claim is:

1. A complex copper compound of a disazo dyestuff of the general formula

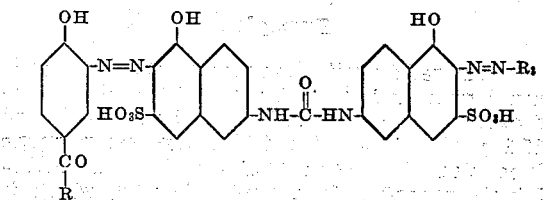

in which R stands for a hydrocarbon radical containing up to 7 carbon atoms and $R_3$ stands for a radical of the benzene series containing in ortho-position to the —N=N— group a hydroxyl group.

2. A complex copper compound of a disazo dyestuff of the general formula

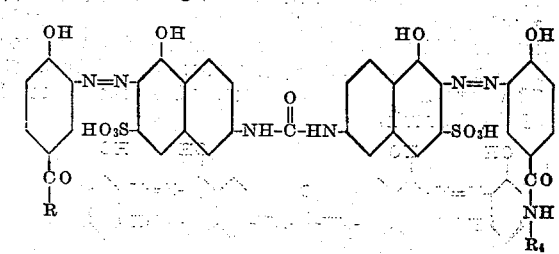

in which R and $R_4$ each stands for a hydrocarbon radical containing up to 7 carbon atoms.

3. A complex copper compound of the disazo dyestuff of the formula

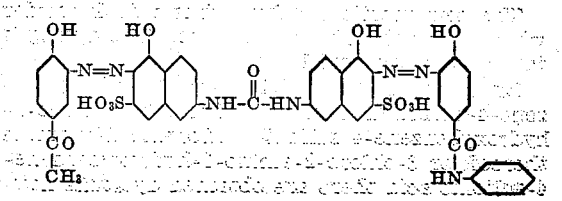

4. A complex copper compound of the disazo dyestuff of the formula

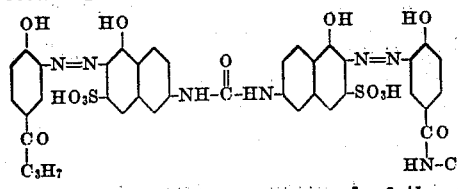

5. A complex copper compound of the disazo dyestuff of the formula

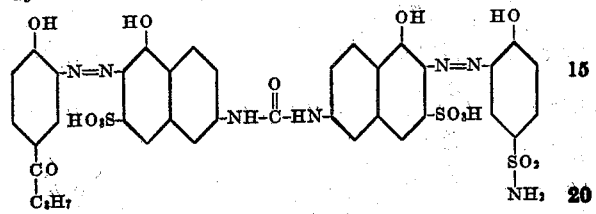

OTTO KAISER.
WILLY WIDMER.
ARTHUR BUEHLER.
CHRISTIAN ZICKENDRAHT.

REFERENCES CITED

The following references are of record in the file of this patent:

UNITED STATES PATENTS

| Number | Name | Date |
| --- | --- | --- |
| 1,338,414 | Anderwert et al. | Apr. 27, 1920 |
| 1,994,116 | Straub et al. | Mar. 12, 1935 |
| 2,217,693 | McNally et al. | Oct. 15, 1940 |
| 2,317,365 | Dickey et al. | Apr. 27, 1943 |
| 2,390,152 | Keller | Dec. 4, 1945 |
| 2,393,652 | Olpin et al. | Jan. 29, 1946 |
| 2,438,754 | Krebser et al. | Mar. 30, 1948 |